INVENTORS
Thomas W. Schultz
Wesley I. Crabiel
BY Harness, Dickey & Pierce
ATTORNEYS March 31, 1959 T. W. SCHULTZ ET AL 2,879,612
HYDRAULIC DRIVE FOR DITCHER CONVEYOR
Filed May 2, 1956 5 Sheets-Sheet 5
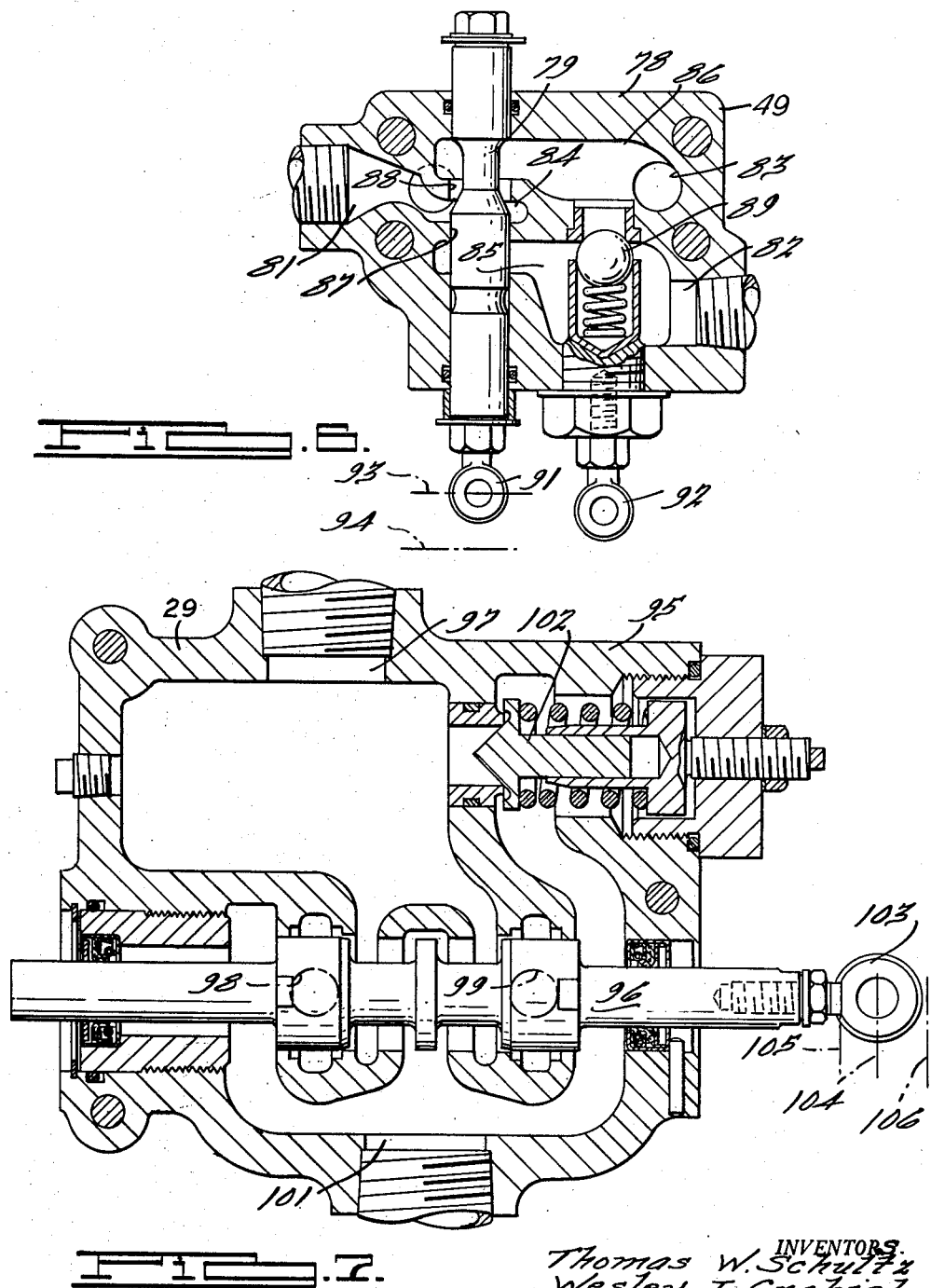
INVENTORS.
Thomas W. Schultz
Wesley I. Crabiel
BY
Harness, Dickey & Pierce
ATTORNEYS.

United States Patent Office 2,879,612
Patented Mar. 31, 1959

2,879,612

HYDRAULIC DRIVE FOR DITCHER CONVEYOR

Thomas W. Schultz and Wesley I. Crabiel, Findlay, Ohio, assignors to Gar Wood Industries, Inc., Wayne, Mich., a corporation of Michigan Application May 2, 1956, Serial No. 582,100

4 Claims. (Cl. 37—97)

This invention relates to ditch digging equipment, and more particularly to drive means for the conveyors of conventional types of ditchers which throw earth to either side of the trench.

In excavating equipment of this type, it is often desirable to adjust the speed of the conveyor in order that the distance of the deposited earth from the trench line may be varied. It is a general object of the present invention to provide an improved variable speed control for ditcher conveyors which is economical to fabricate, efficient in operation, and requires a minimum of maintenance.

It is another object to provide an improved speed control for conveyors of this type which operates on hydraulic principles and which utilizes the hydraulic power available for the hoist of the digging element boom, thus eliminating the need for extra pumping capacity to attain higher conveyor speeds.

It is a further object to provide an improved variable speed drive for conveyors of the above character, in which the manual controls are of a relatively simple nature, and which automatically insures sufficient hydraulic power for the boom hoists whenever such is required.

It is also an object to provide an improved conveyor device of this nature which is adapted for use with various species of ditchers, such as wheel, ladder or chain types.

Other objects, features and advantages of the present invention will become apparent from the subsequent description, taken in conjunction with the accompanying drawings.

In the drawings:

Figure 6 is a cross-sectional view of one of the diverter valves showing its internal construction; and Figure 7 is a cross-sectional view of the conveyor valve shown in its neutral position.

Figure 1:
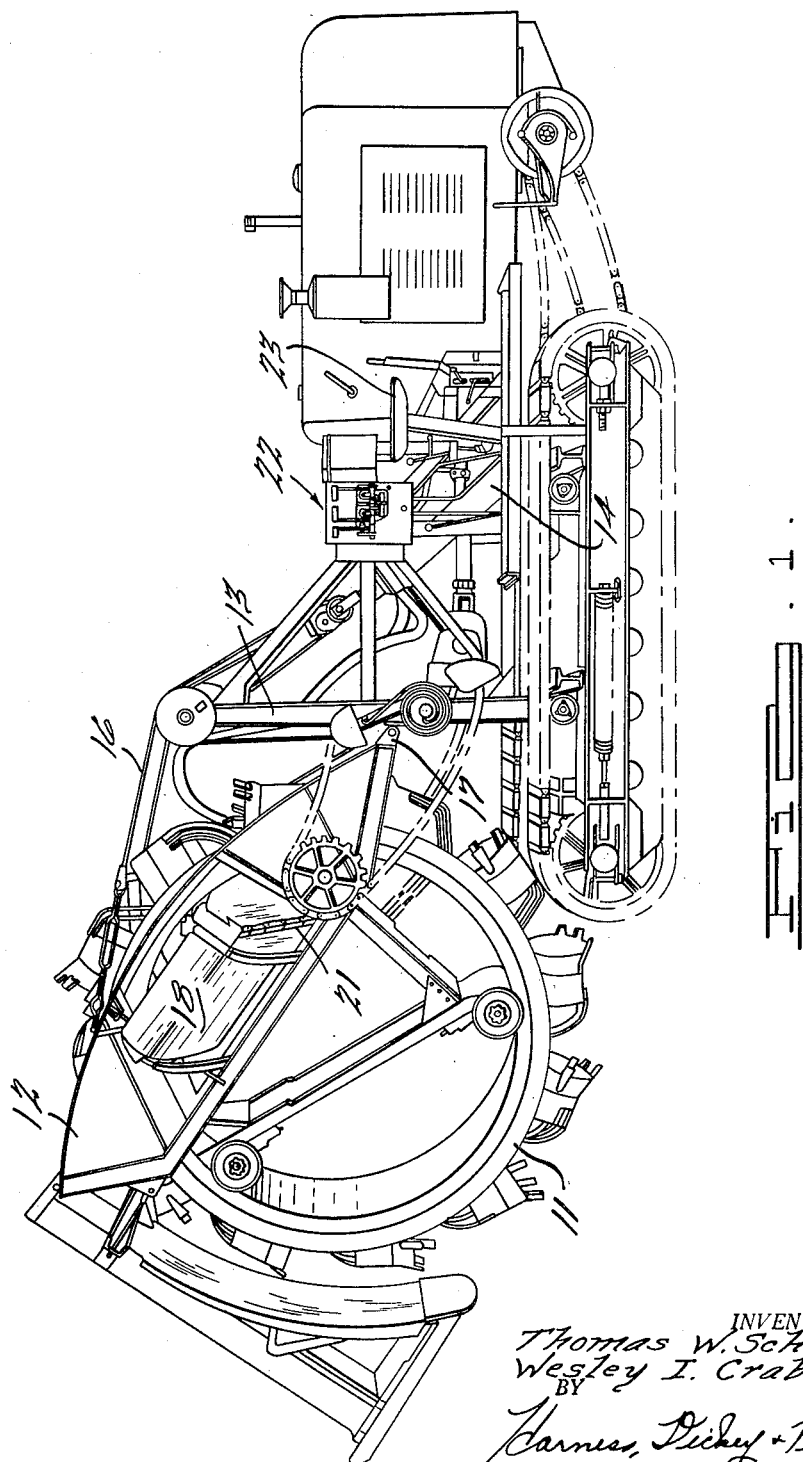
Figure 1 is a side elevational view of a wheel type ditcher incorporating the novel and improved variable speed drive for the discharge conveyor, showing the location and arrangement of the manual controls.

The invention comprises in general a hydraulic motor for driving the conventional belt conveyor of a ditcher, together with novel and improved means for varying the fluid supply to the motor. The ditcher is provided with one or more hoist cylinders for the digging element boom, the illustrated embodiment showing a wheel ditcher with two cylinders connected respectively to the inner and outer ends of the boom in the conventional manner. It will be understood however that the invention could be applied to other types of ditching equipment wherein only one hoist motor is provided for the boom. In the illustrated construction, three pumps are provided, one for the conveyor motor and the other two for the two hoist motors. Three reversing valves are provided for the three motors, one valve controlling flow of fluid from the first pump to the conveyor motor and the second and third valves controlling the fluid flow from the two hoist pumps to their respective motors. Each of the three control valves is movable from a neutral position in which its motor remains unactuated, in opposite directions to actuate its motor in the sense desired. In the case of the conveyor valve, the neutral position permits flow from the supply pump to the tank. In the case of each of the hoist valves, the neutral or hold position permits flow from the pump to a diverter valve, one such valve being provided for each of the two hoist valves. Each diverter valve is movable between a first position in which it conducts fluid to tank, and a second position in which the fluid is conducted to the pressure connection of the conveyor valve.

In this manner, the conveyor valve may be supplied by one, two or three pumps depending upon the settings of the two diverter valves. With both diverter valves in their tank position, the conveyor motor will receive fluid only from its own pump and will be driven at a relatively slow speed. When one of the diverter valves is shifted to conveyor position, fluid will be supplied to the conveyor motor from both its own pump and one of the hoist pumps, and the conveyor will consequently be driven at a higher speed, delivering the earth a further distance from the ditcher. When both diverter valves are in conveyor position, a still higher speed will be attained by the conveyor since its motor is supplied by all three pumps.

Means are provided for automatically cutting off the fluid supply to each of the diverter valves when its corresponding hoist motor is being operated. In this manner, instantaneous operation of either or both hoists is assured with only one control manipulation being necessary in each case. Since the hoist will normally be operated for only short periods, the slowing down of the conveyor which results from the momentary reduction in supply fluid will be unimportant. When operation of a hoist is no longer required, shifting of the hoist valve to hold position will automatically reconnect the supply to the corresponding diverter valve, and the proper conveyor speed will immediately be resumed.

Figure 1 illustrates a typical ditcher incorporating the novel and improved conveyor drive of this invention. The ditcher has a digging wheel 11 carried by a boom 12, the inner end of which is slidably mounted on vertical standards 13. Movement of the boom is controlled by a pair of hoist motors 14 and 15 (motor 15 being invisible in Figure 1 but immediately behind motor 14). Motor 14 may, for example, control the height of the outer end of boom 12 by means of cable 16, while motor 15 controls the height of trunnions 17 which pivotally support the inner end of the boom. A belt conveyor 18 is provided for receiving the earth from wheel 11 and depositing it at a desired lateral distance from the ditcher. A fluid motor 19 (not visible in Figure 1) drives belt 18 through a chain and sprocket connection 21. A set of control handles generally indicated at 22 is mounted on the ditcher adjacent the operator's seat 23 for controlling the hydraulic system.

Figure 2:
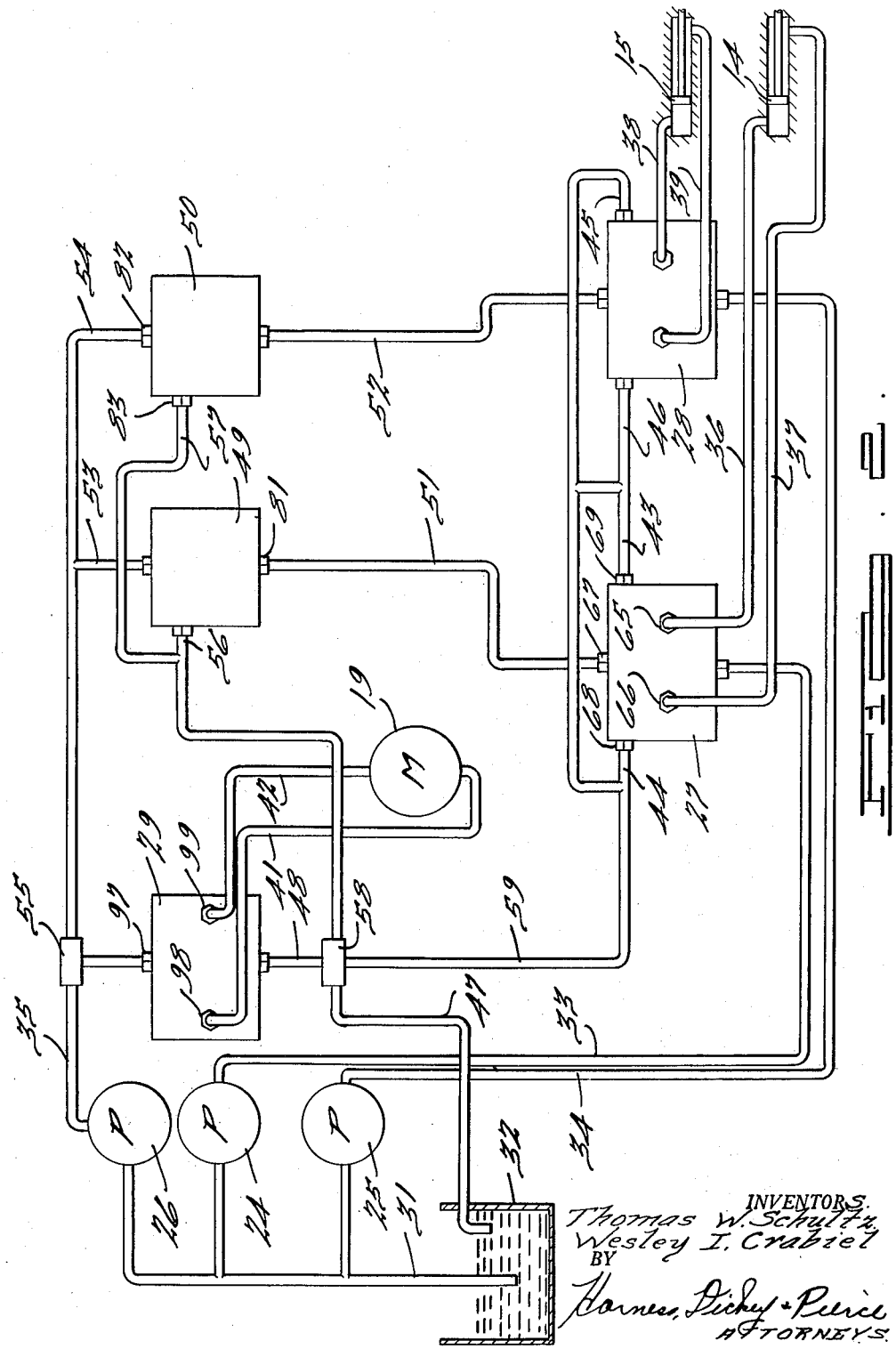
Figure 2 is a schematic diagram of a preferred hydraulic circuit embodying the improved conveyor drive, showing the interconnections with the hydraulic hoist circuit.

The system is shown in Figure 2 and comprises a pair of hoist pumps 24 and 25 for supplying motors 14 and 15, respectively, and a pump 26 for supplying conveyor motor 19. Pump 26 may be of larger capacity than pumps 24 or 25 in accordnace with requirements. A pair of hoist valves 27 and 28 are interposed between pumps 24 and 25 and their respective fluid motors, while a conveyor valve 29 is positioned between pump 26 and motor 19. In particular, the connections comprise a supply line 31 from a tank 32 to pumps 24, 25 and 26, and pressure lines 33, 34 and 35 from these pumps, respectively, to valves 27, 28 and 29. Leading from valve 27 to opposite ends of hoist motor 14 are a pair of conduits 36 and 37, while similar conduits 38 and 39 lead from valve 28 to motor 15. Conveyor valve 29 likewise has two conduits 41 and 42 connecting it to motor 19 for drive in opposite directions.

Valve 27 is provided with tank connections 43 and 44 corresponding to hoist connections 36 and 37, respectively, and valve 28 has tank connections 45 and 46 serving hoist connections 38 and 39. These tank connections are led by appropriate conduits to a common tank conduit 47, which also serves a tank connection 48 leading from conveyor valve 29.

A pair of diverter valves 49 and 50 are connected to hoist valves 27 and 28, respectively, by means of conduits 51 and 52. The diverter valves have conveyor conduits 53 and 54, respectively, leading to the pressure port of conveyor valve 29 through a connection 55 which is common with supply conduit 35. Diverter valves 49 and 50 are further provided with tank conduits 56 and 57, respectively, leading to a connection 58 which is common with tank conduit 48 and a common tank conduit 59 connected to conduits 43—46.

Figure 5:
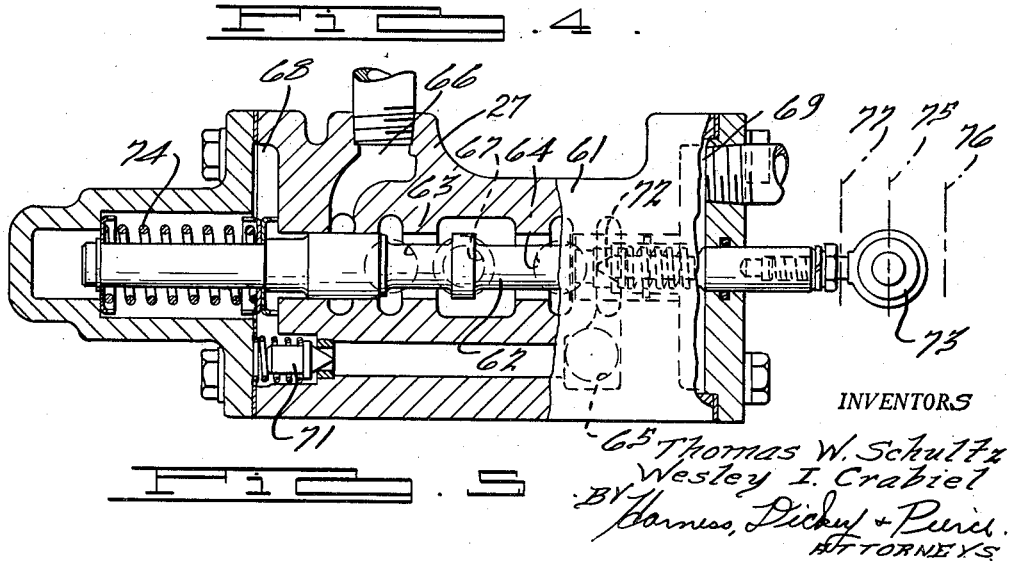
Figure 5 is a cross-sectional view taken along the line 5—5 of Figure 3 and showing the details of one of the hoist valves.

Figure 5 is a cross-sectional view of a suitable hoist valve 27 or 28. As shown, the valve has a casing 61 with a spool 62 slidable therein. Casing 61 is provided with a pair of spaced pressure ports shown in dot-dash lines at 63 and 64, respectively, a lower port 65, raise port 66, a diverter port 67 and tank ports 68 and 69. Lower port 65 is connected to tank ports 68 and 69 through a pair of check valves 71 and 72, respectively. The outer end of spool 62 is provided with an eye 73 for connection to the control handle. A spring 74 normally holds spool 62 in a neutral or hold position indicated by line 75 on the axis of eye 73. When moved to the right in Figure 5, spool 62 will arrive at the lower position indicated by line 76, and when moved to the left the raise position 77 is obtained.

When in hold position, pressure ports 63 and 64 are connected to diverter port 67, the latter being connected to the corresponding diverter valve by means of conduits 51 or 52, as indicated in Figure 2. Hoist ports 65 and 66 will be cut off at this time, thereby preventing flow of fluid to or from the hoist so that the latter will be locked in its desired position. When spool 62 is moved to its lower position, pressure port 64 will be connected to lower port 65 and raise port 66 will be connected to tank port 68. At the same time pressure from both ports 63 and 64 to diverter port 67 will be cut off, so that no fluid may flow to the diverter valve. When spool 62 is moved to the raise position, pressure port 63 will be connected to raise port 66 and lower port 65 will be connected to tank port 69. Again, diverter port 67 will be cut off from pressure supply, being disconnected from both ports 63 and 64.

It should be noted that when the valve is moved to its raise or to its lower position, two functions are carried out simultaneously: The hoist is given its proper pump and tank connections, and at the same time, pressure to the diverter valve is cut off. Likewise, when the valve is returned to its hold position, locking of the hoist motor and resumption of supply to the diverter valve are accomplished by a single movement.

Figure 6 shows the construction of a suitable diverter valve 49 or 50 for use in the hydraulic system. The valve comprises a casing 78 carrying a spool 79 and having a pressure port 81, a conveyor port 82 and a tank port 83. Pressure port 81 is adapted for connection to lines 51 or 52, conveyor port 82 is connectable to conduits 53 or 54 and tank port 83 may be connected to conduits 56 or 57. Pressure port 81 leads to a chamber 84 within casing 78, conveyor port 82 is connected to a chamber 85, and tank port 83 is fed from a chamber 86. Chambers 84 and 85 are connected by a bore 87, chambers 84 and 86 are connected by a bore 88, and chambers 85 and 86 are connected by a check valve 89 permitting flow only from chamber 86 to chamber 85.

Spool 79 is provided with an eye 91 for connection to the control handle, and the casing is further provided with a stationary eye 92, the purpose of which is described below. Valve spool 79 is movable between an upper or tank position shown at line 93 on the axis of eye 91 and a lower or conveyor position indicated at line 94. When in tank position, chamber 84 is connected with chamber 86 so that fluid will be conducted from pressure port 81 to tank port 83. At the same time, conveyor port 82 is cut off from fluid pressure. When spool 79 is moved to its lower or conveyor position, chamber 84 will be cut off from chamber 86 and connected to chamber 85 so that pressure will be supplied to conveyor port 82.

Conveyor control valve 29 is shown in detail in Figure 7. The valve comprises a casing 95 carrying a spool 96 and having a pressure port 97, a left hand conveyor port 98, a right hand conveyor port 99, and a tank port 101. The casing is also provided with a relief valve 102 connecting pressure port 97 to tank port 101. An eye 103 is mounted on the outer end of spool 96, and the spool is movable in either direction from a neutral position indicated by line 104 on the axis of eye 103. In particular, spool 96 is movable leftwardly to a position indicated by line 105 in which pressure port 97 is connected to left hand conveyor port 98 and right hand conveyor port 99 is connected to tank. Similarly, movement of spool 96 rightwardly to the position indicated by line 106 will connect pressure port 97 to right hand conveyor port 99 and left hand conveyor port 98 to tank port 101.

Figure 3:
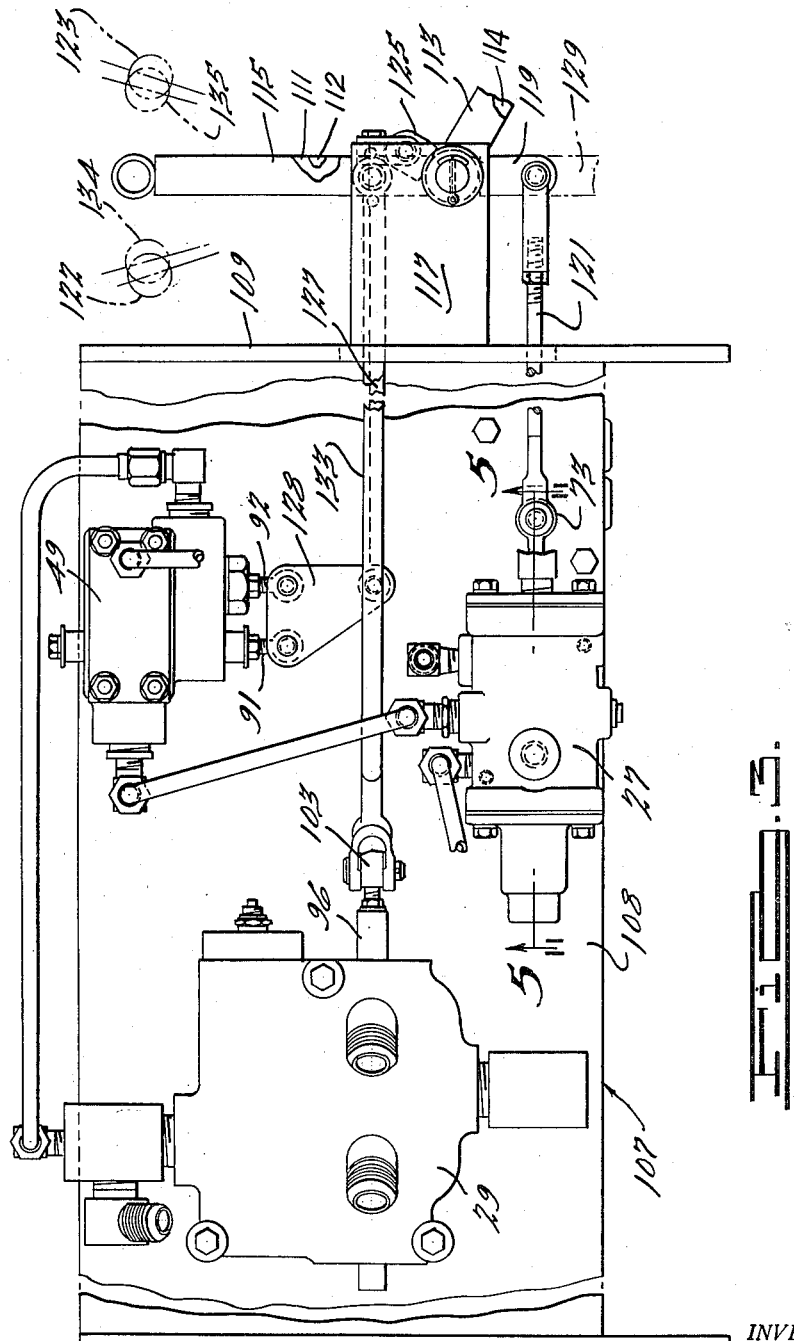
Figure 3 is a side elevational view of a suitable arrangement of the manual controls and the valves, showing the manner in which the hoist valves, diverter valves and conveyor valve are interconnected.
Figure 4:
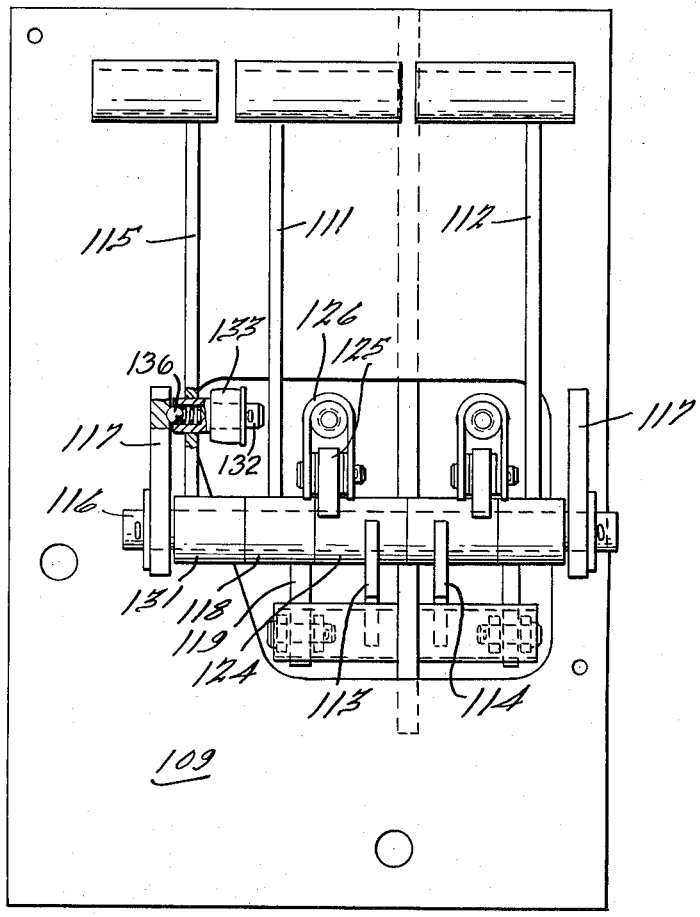
Figure 4 is a front elevational view of the manual controls of Figure 3, showing the structural details of the levers.

The general arrangement of the valves and their operating levers is shown in Figures 3 and 4. The valves, levers and connecting elements are suitably carried by a mount generally indicated at 107, this mount being of I-shaped configuration and having a web plate 108 on which the valves are mounted and a face plate 109 to which the levers are secured. Figure 3 shows the valves mounted on one side of web plate 108, these comprising hoist valve 27, a diverter valve 49 and the conveyor control valve 29. The other side of web plate 108, which is not shown in the drawings, will carry hoist valve 28, diverter valve 50, and may also support the fluid pumps and tank. The entire unit is thus capable of being pre-assembled and mounted on a conventional ditcher in the manner shown in Figure 1.

The control levers comprise a first hoist lever 111 connected to hoist valve 27, a second hoist lever 112 for controlling hoist valve 28, a first conveyor speed-up lever 113 connected to diverter valve 49, a second conveyor speed-up lever 114 controlling diverter valve 50, and a conveyor lever 115 for operating conveyor valve 29. Levers 111—115 are all supported for rocking movement on a spindle 116 carried by a pair of brackets 117 secured to face plate 109. Hoist lever 111 is secured to a sleeve 118 on spindle 116, and a short arm 119 extends from the opposite side of this sleeve. A link 121 is pivotally connected between arm 119 and eye 73 of hoist valve spool 62. When lever 111 is in its vertical position shown in Figure 3, valve 27 will be in its neutral position. When this lever is swung counterclockwise in Figure 3 to the dot-dash position shown at 122, link 121 will be pulled to the right, shifting valve 27 to the hoist lower position. Upon swinging lever 111 clockwise to position 123 shown in double dot-dash lines, link 121 will be shifted to the left, moving valve 27 to the hoist raise position. Hoist lever 112 is connected to hoist valve 28 in a similar manner.

Conveyor speed-up lever 113 is mounted on a sleeve 124 carried by spindle 116. Secured to sleeve 124 is a short arm 125 extending substantially at right angles to lever 113. A U-shaped clamp 126 is pivoted at its outer ends to arm 125 and its mid-portion is secured to one end of a link 127. The opposite end of link 127 is pivotally connected to a triangular plate 128 which is mounted for pivotal movement on stationary eye 92 of diverter valve 49. The third corner of plate 128 is pivotally connected to eye 91 on spool 79 of the diverter valve. When lever 113 is in the solid line position of Figure 3, diverter valve 49 will be in its tank position. Upon swinging lever 113 clockwise into the dot-dash position 129 of Figure 3, link 127 will be shifted to the right, swinging plate 128 about the axis of eye 92. Eye 91 of spool 79 will thus be moved downwardly, shifting diverter valve 49 into its conveyor position. Lever 114 is connected to diverter valve 50 in a similar manner.

Conveyor lever 115 is mounted on a sleeve 131 carried by spindle 116. This lever carries a pin 132 to which is connected a link 133 extending to eye 103 of conveyor valve spool 96. The solid lines of Figure 3 show lever 115 in its float position. When the lever is swung counterclockwise to the position indicated at 134 in dot-dash lines, link 133 will be shifted to the left, moving the conveyor valve to its left hand conveyor discharge position. Upon swinging conveyor lever 115 clockwise to the double dot-dash line position indicated at 135, link 133 will be shifted to the right, moving valve 29 to the right hand conveyor discharge position. A spring-pressed detent ball 136 engageable with notches in one of brackets 117 may be carried by pin 132 to retain the conveyor lever in its adjusted position.

Operation

Assume that it is initially desired to lower both the inner and outer ends of boom 12, initiate rotation of digging wheel 11, and obtain left hand discharge of the earth at a relatively slow speed. With hoist pumps 24 and 25 and conveyor pump 26 operating, hoist levers 111 and 112 will be shifted to position 122 of Figure 3, conveyor lever 115 will be retained in its solid line or float position, and conveyor speed-up levers 113 and 114 will be shifted to their solid line positions. Fluid from pumps 24 and 25 will be conducted through hoist valves 27 and 28, respectively, to hoist motors 14 and 15, lowering both ends of boom 12. During this time conveyor 18 will remain stationary, since pressure supplied to conveyor valve 29 from pump 26 will be returned to tank. When hoist motors 14 and 15 have brought boom 12 to its desired position, levers 111 and 112 will be returned to their solid line position of Figure 3, in which position fluid motors 14 and 15 will be locked against movement. The fluid supplied to hoist valves 27 and 28 will be conducted to diverter ports 67 of these valves and thence to diverter valves 49 and 50 respectively. However, since these valves are in their tank position the fluid supplied to them will be returned to tank and will not be fed to conveyor valve 29. After digging wheel 11 has been started, conveyor lever 115 is shifted to position 134 of Figure 3, thus moving conveyor valve 29 to its left hand discharge position. Since the conveyor valve is supplied with fluid only by pump 26, conveyor motor 19 will be driven at a relatively slow rtae.

Should it be desired to speed up the discharge rate of the conveyor, either conveyor speed-up lever 113 or 114 is moved to position 129 of Figure 3. Corresponding diverter valve 49 or 50 will thus be shifted to its conveyor position in which the fluid supplied to it from its corresponding hoist valve will be conducted to conveyor valve 29. Since conveyor motor 19 is now being fed by pump 24 or 25 in addition to pump 26, the conveyor will move at a higher speed, depositing the earth a greater distance from the ditcher. Should a still greater speed of the conveyor be desired, the other conveyor speed-up lever 113 or 114 is shifted to position 129, so that conveyor motor 19 is fed by all three pumps 24, 25 and 26. It should be noted that the conveyor speed changes are effected simply by changing the volume of fluid supplied to motor 19, and that these changes do not involve the use of pressure-responsive valves or other connections which might cause overheating in the hydraulic system or similar harmful effects.

When it is required that hoist motor 14, for example, be actuated to lift or lower the boom, hoist valve 27 is shifted in the desired direction by movement of lever 111. If the piston of hoist motor 14 is to be retracted, hoist lever 111 will be shifted to hoist raise position 123, connecting pressure port 63 to raise port 66 and lower port 65 to exhaust port 69. At the same time diverter port 67 will be cut off from supply, and conveyor motor 19 will thus be slowed down because pump 24 is no longer supplying conveyor valve 29. When hoist motor 14 has attained its desired position, hoist lever 111 will be shifted back to its hold position. Both hoist ports 65 and 66 will be cut off, and fluid from pump 24 will be conducted through diverter port 67 and diverter valve 49 to conveyor valve 29. Conveyor motor 19 will thus resume its faster rate of speed. It should be noted that when operating the hoist motors it is unnecessary for the operator to pay attention to conveyor speed-up levers 113 and 114 or conveyor lever 115. These may be left in their set positions, the operator handling only the desired hoist levers 111 or 112. Since the time during which a hoist motor is operated will normally be of short duration, the momentary decrease in conveyor speed will normally be unnoticeable and will have no disadvantageous effects on operation of the ditcher. Should it be desired to reduce the conveyor speed, one or both of conveyor speed-up levers 113 and 114 may be shifted to their solid line position of Figure 3, moving the corresponding diverter valve 49 or 50 to tank position.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a ditcher of the type having a digging element, a boom carrying said element, a fluid operated hoist motor for said boom, and a conveyor, a fluid operated conveyor motor, a hoist pump connected to said hoist motor, a conveyor pump connected to said conveyor motor, a hoist valve between said hoist pump and said hoist motor, said hoist valve being movable to a raise position, a lower position, and a hold position, a fluid connection between said hoist valve and said conveyor motor, a diverter valve in said fluid connection, means responsive to movement of said hoist valve to its hold position for supplying fluid from said hoist pump to said diverter valve, and means for moving said diverter valve between a tank position in which said fluid is returned to tank and a conveyor position in said said fluid is conducted to said conveyor motor.

2. In a ditcher of the type having a digging element, a boom carrying said element, a fluid operated hoist motor for said boom, and a conveyor, a fluid operated conveyor motor, a hoist pump for said hoist motor, a conveyor pump for said conveyor motor, a hoist valve between said hoist pump and said hoist motor, said valve being movable between a first position connecting said hoist pump with said hoist motor and a second position cutting off such connection, a diverting connection between said hoist valve and said conveyor motor, means for selectively enabling and disenabling said diverting connection, and means responsive to movement of said hoist valve to its second position for connecting said hoist pump with said diverting connection.

3. In a ditcher of the type having a digging element, a boom carrying said eleemnt, a fluid operated hoist motor for said boom, and a conveyor, a fluid operated conveyor motor, a hoist pump for said hoist motor, a conveyor pump for said conveyor motor, a hoist valve between said hoist pump and said hoist motor, said hoist valve being movable between a raise position, a lower position, and a hold position, a conveyor valve between said conveyor pump and said conveyor motor, a connection between said hoist valve and said conveyor valve, means responsive to movement of said hoist valve to its hold position for connecting said hoist pump to said last mentioned connection, and a diverter valve in said last-mentioned connection movable between a tank position in which fluid from said hoist motor is returned to tank and a conveyor position in which said fluid is supplied to said conveyor valve.

4. In a ditcher of the type having a digging element, a boom carrying said digging element, a first fluid operated hoist motor for one end of said boom, a second fluid operated hoist motor for the other end of said boom, and a conveyor, a fluid operated conveyor motor, a first hoist pump connected to said first hoist motor, a second hoist pump connected to said second hoist motor, first and second hoist valves between said pumps and their respective motors, each of said valves being movable between a raise position, a lower position, and a hold position, a conveyor pump connected to said conveyor motor, a conveyor valve between said conveyor pump and said conveyor motor, diverter connections from each of said hoist valves to said conveyor valve, means responsive to movement of either of said hoist valves to its hold position for connecting its corresponding hoist pump to its respective diverter connection, a pair of diverter valves in said diverter connections, each of said diverter valves being movable between a tank position in which the fluid from its corresponding hoist pump is returned to tank and a conveyor position in which said fluid is supplied to said conveyor valve, and means responsive to movement of either of said hoist valves to its raise or its lower position for disconnecting its corresponding hoist pump from its respective diverter connection independently of the position of the corresponding diverter valve.

References Cited in the file of this patent
UNITED STATES PATENTS

| | | |
|---|---|---|
| 2,103,530 | Henry | Dec. 28, 1937 |
| 2,321,352 | Askue | June 8, 1943 |
| 2,664,708 | Norelius et al. | Jan. 5, 1954 |

UNITED STATES PATENT OFFICE

CERTIFICATE OF CORRECTION

Patent No. 2,879,612  March 31, 1959

Thomas W. Schultz et al.

It is hereby certified that error appears in the printed specification of the above numbered patent requiring correction and that the said Letters Patent should read as corrected below.

Column 5, line 67, for "rtae" read — rate —; column 6, line 62, for "said", first occurrence, read — which —; column 7, line 4, for "eleemnt" read — element —.

Signed and sealed this 25th day of August 1959.

(SEAL)
Attest:

KARL H. AXLINE
Attesting Officer

ROBERT C. WATSON
Commissioner of Patents